Sept. 15, 1936.   C. FIELD   2,054,074
ICE MAKING AND APPARATUS
Original Filed May 23, 1930   3 Sheets-Sheet 1

CROSBY FIELD
INVENTOR
BY Janney Blair & Curtis
ATTORNEYS

Sept. 15, 1936.　　　　　C. FIELD　　　　　2,054,074
ICE MAKING AND APPARATUS
Original Filed May 23, 1930　　3 Sheets-Sheet 2

CROSBY FIELD
INVENTOR
BY Janney, Blair & Curtis
ATTORNEYS

Sept. 15, 1936.  C. FIELD  2,054,074
ICE MAKING AND APPARATUS
Original Filed May 23, 1930  3 Sheets-Sheet 3
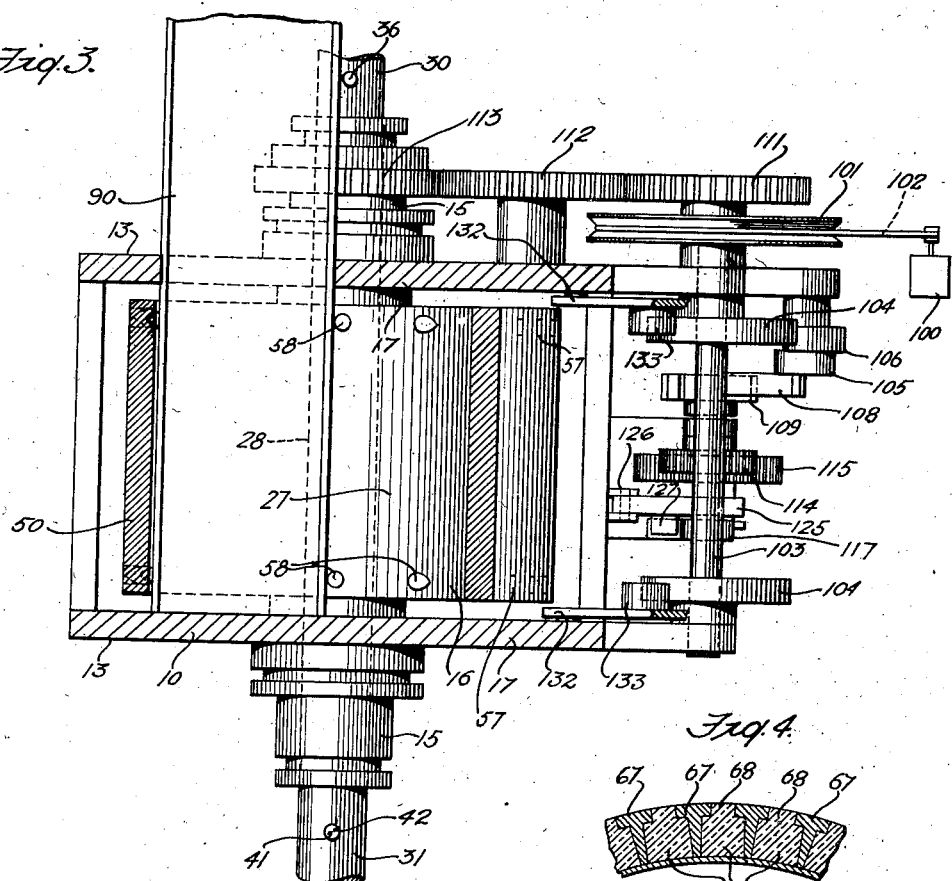
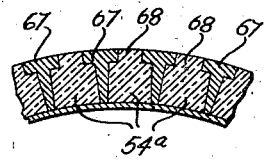
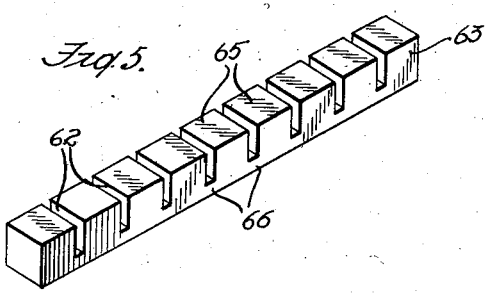
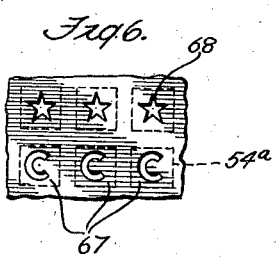
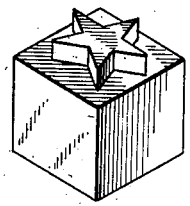
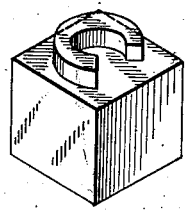
CROSBY FIELD
INVENTOR
BY
ATTORNEYS Patented Sept. 15, 1936

2,054,074

UNITED STATES PATENT OFFICE 2,054,074

ICE MAKING AND APPARATUS

Crosby Field, Brooklyn, N. Y., assignor, by mesne assignments, to Flakice Corporation, Wilmington, Del., a corporation of Delaware Application May 23, 1930, Serial No. 454,853
Renewed September 25, 1935

28 Claims. (Cl. 62—105)

This invention relates to the art of refrigeration and apparatus for use in connection therewith.

The particular application of the invention selected to illustrate the principles thereof is concerned with the manufacture of ice in the form of small blocks. One of the objects thereof is to enable ice in this form to be quickly and economically produced in large volume. Another object is to facilitate the handling and packing of the blocks produced. Other objects will be in part evident and in part pointed out hereinafter.

The invention accordingly consists in the features of construction, combinations of elements, arrangements of parts and in the several steps and relation and order of the same, all as will be herein illustratively described and the scope of the application of which will be indicated in the following claims.

In the accompanying drawings in which are shown the features of a selected embodiment of this invention:—

Fig. 3 is a sectional view substantially on the line 3—3 of Fig. 1;

Fig. 4 is a longitudinal section of a portion of a modified form of belt construction, and Figs. 5 to 8 are detail views.

The present apparatus in general comprises a tank to contain water or other liquid to be frozen and in which is partially submerged a revoluble cylinder through which is circulated a refrigerating medium. A belt or apron is wrapped about this cylinder and in this belt are provided series of ice-shaping perforations or openings extending therethrough to form pockets with the wall of the cylinder in which the water or other liquid is frozen by heat exchange through the cylinder wall. After the liquid is frozen in the pockets, the cylinder and belt are rotated by a step by step movement to convey the ice from the cylinder, and heat is applied to a portion of the cylinder wall to disengage the ice therefrom prior to the belt leaving such wall. Suitable discharging mechanism is provided which acts to eject the ice blocks from the pockets in the belt during successive pauses of such belt.

The tank

Figure 1:
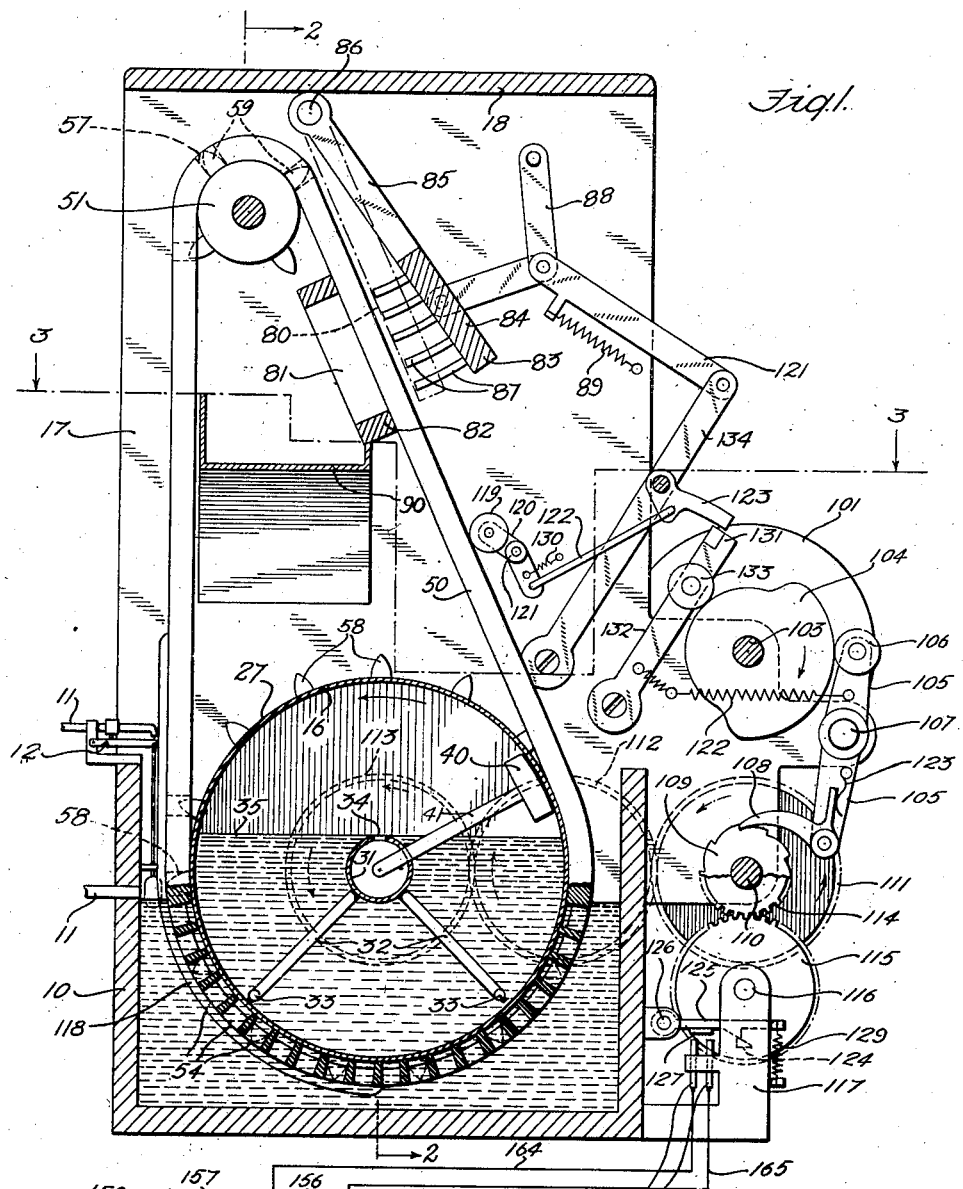
Fig. 1 is a sectional view substantially on the line 1—1 of Fig. 2.
Figure 2:
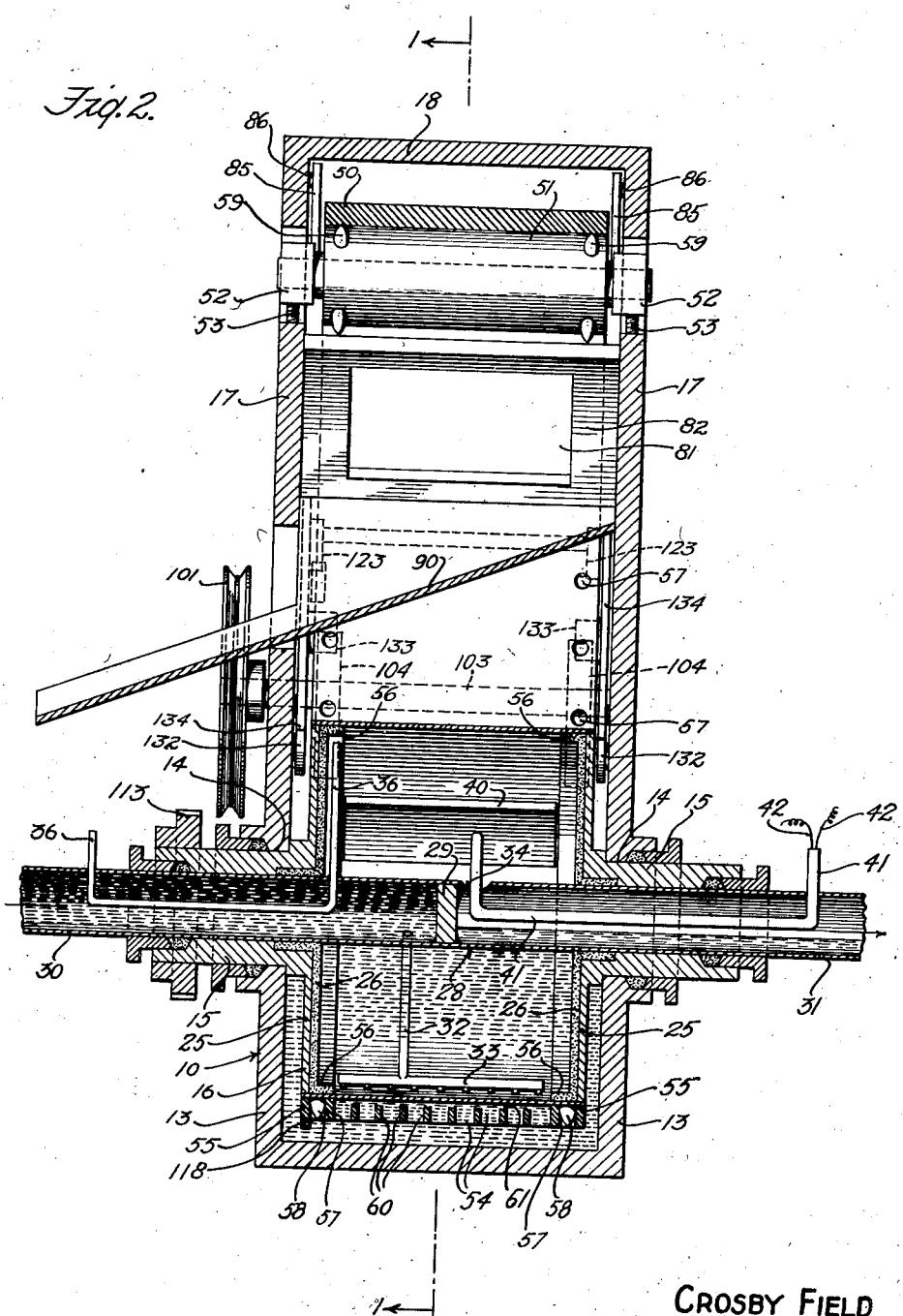
Fig. 2 is a sectional view substantially on the line 2—2 of Fig. 1.

Referring to the lower portion of Figs. 1 and 2, there is shown a tank 10 which may be supported in any convenient manner. This tank is open at the top and the walls thereof are preferably insulated to prevent the conduction of heat therethrough. The water enters the tank through a suitable supply pipe as 11 which is controlled by a float valve as 12 to maintain a substantially constant level within the tank. Referring particularly to Fig. 2, it will be seen that in the opposite end walls 13 of the tank there are provided suitable bearings as 14 within which are revolubly mounted the corresponding hubs 15 on the cylinder 16. The end walls 13 are extended upwardly beyond the side walls as at 17 to form supports for the discharging mechanism, and the upper extremities of these walls may be connected by a cross-brace or wall as 18.

The cylinder construction

The cylinder 16 is provided with oppositely disposed ends or heads 25 which are preferably insulated as at 26 to prevent the freezing of the water on the outer face thereof. The thin cylindrical wall 27 connecting these heads is preferably formed of metal or other conducting material to facilitate heat exchange therethrough. A stationary pipe 28 extends axially through the cylinder and is provided with a partition 29 which subdivides the pipe into an admission or supply pipe 30 and an exhaust pipe 31. The pipe 30 is connected to a source of supply of a refrigerating medium. The refrigerating medium in the pipe 30 is admitted to the interior of the cylinder 16 through branch pipes 32 on the outer ends of which are provided jet heads 33. These heads serve to distribute the refrigerating medium within the cylinder and particularly to secure the application thereof to the submerged portion of the cylindrical wall 27. In the top of the pipe 31 is provided an outlet passage 34 so that the refrigerating medium within the cylinder will not rise above this point during the operation of the apparatus. The level of the refrigerating medium is indicated in Fig. 1, at 35. In this manner a constant circulation of the refrigerating medium may be maintained within the cylinder. A vent pipe 36 communicates with the upper portion of the cylinder to prevent excessive air volume in the cylinder.

Within the cylinder 16 is located a suitable heater as 40 which is mounted on the outer extremity of a pipe 41 extending through the overflow passage 34 into the pipe 31 and thence outwardly therefrom at some convenient point outside of the tank 10. The heater may be provided with an electrical heating unit (not shown) of any suitable type and the conductors therefor as 42 may be led through the pipe 41 and be connected to the leads to the motor, to be described hereinafter. Any other suitable means for locally applying heat to the wall 27 may be substituted therefor.

The belt or apron

A relatively thick belt or apron 50 of rubber or other suitable material is partially wrapped about the cylinder 16 and passes upwardly and over an idler pulley 51 mounted in suitable bearings 52 which may be provided with adjusting means as 53 to enable the proper tension to be maintained in the belt. The belt 50 is provided for a portion of its length with a series of transverse openings or slots as 54 which, in the form shown, extend therethrough and for a considerable portion of the width of the belt, leaving strips 55 at opposite margins of the belt connecting the ends of the solid portion of the belt or that not provided with the openings 54. These strips 55 are adapted to take up the longitudinal strain on the belt.

The openings 54 in the belt or apron form with the portion of the cylindrical wall 27 in contact therewith, molds or pockets into which the water or other liquid within the tank flows, and in which this water is frozen by transfer of heat through the cylinder wall. The insulation 26 within the cylinder is preferably extended laterally as at 56 to underlie the portion of the cylinder wall opposite the strips 55 of the belt, so that ice will not form to any material extent on this portion of the cylinder wall. The marginal portions of the entire belt 50 may be provided with reinforced slots as 57 to admit corresponding teeth 58 and 59 on the peripheries of the cylinder 16 and the pulley 51 respectively, to insure a positive driving action between the cylinder and the belt.

In the elongated openings 54 in the belt as shown, the ice will be formed in blocks of a corresponding shape but if smaller blocks such as cubes are desired, transverse partitions as 60 may be provided in such openings either to completely separate the individual cubes or to permit them to be connected by a web in the manner indicated in Figs. 4 and 5 of the drawings. This latter condition may be provided by having the partitions 60 shallower than the thickness of the belt to leave a space as 61 between the inner edge of the partition and the cylinder wall. Referring to Fig. 5, these webs produce in the complete block 63 as frozen in one of the openings or molds 54 a series of slots as 62.

The individual blocks or cubes as 65 may at a subsequent time be separated by breaking the webs 66, but the series of cubes thus united may be more conveniently handled and packed than a like number of separated cubes. Also, the individual pockets for the cubes may be partially closed at the top by a wall as 67 (Fig. 4) in which the openings 68 over such pockets may be in the form of monograms, letters or other shapes as shown in Fig. 6, so that a replica of these designs may be provided on the top of the cubes as shown in Figs. 7 and 8. A similar result may be accomplished by placing over the pockets a cover in which are provided such openings. In Fig. 4 the openings 54a correspond to the openings 54 of the previously described embodiment.

The discharging mechanism

Referring particularly to the upper portion of Figs. 1 and 2, it will be seen that when the belt is rotated in the direction indicated by the arrows in Fig. 1, the blocks of ice formed in the pockets 54 during the freezing operation are carried upwardly until the first group of molds or pockets reaches the position designated in broken lines at 80. In this position the first group is opposite an opening 81 in a discharge table 82, and a discharger 83 is in readiness to eject the blocks from the molds. This discharger comprises a platform 84 supported by arms 85 pivotally mounted at 86 on the extension 17 of the walls 13 of the tank. In the under face of this platform 84 are provided a plurality of ejecting plungers 87, one being provided for each individual pocket in a mold.

This platform is moved to successively eject the blocks of ice by toggles as 88 located at opposite ends of the platform and in the manner which will be presently described. Springs as 89 cause the discharger to be withdrawn after the blocks of ice have been ejected. Beneath the opening 81 in the table 82 is located a chute 90 upon which the ejected blocks fall and are conducted from the machine.

The operating mechanism

Referring to the upper right hand portion of Fig. 3, it will be seen that the apparatus shown is driven by a suitable motor 100 which may be electrically controlled by a system such as is diagrammatically illustrated at the bottom of Fig. 1. Referring again to Fig. 3 and also the right hand portion of Fig. 1, a pulley as 101 is driven from the motor shaft by a belt 102, and this pulley is mounted on a shaft 103 on which is secured a pair of cams 104 which are adapted to impart to the apparatus a step by step operation as will be presently described. The upper of these cams 104 (Fig. 3) operates a rocking lever 105 through the medium of a cam follower 106 on one end of such lever. The lever is fulcrumed on a shaft 107 (Fig. 1) and at the opposite end of such lever from the follower 106 is carried a pawl 108 which is adapted to operate a ratchet 109 on the shaft 110. On this shaft 110 is secured a gear 111 which acts through the medium of the gears 112 and 113 to drive the cylinder 16. The shaft 110 also carries a second gear 114 which meshes with a gear 115 on a stud shaft 116 mounted in suitable bearings in supports 117, the purpose of which will be explained in connection with the control mechanism.

In order to render the plungers inactive while the imperforated portion of the belt 50 is being moved therebeneath, suitable trip mechanism may be provided. This may be secured by placing a cam strip as 118 on the outer face of the belt or apron 50 to act through the medium of a follower roll 119, lever 120 pivoted at 121, link 122 and trigger 123. The roll 119 is held against the belt by a spring 130. When the roll rides on the cam strip 118, the trigger is moved into engagement with the block 131, causing the roll 133 to operate the arm 134 through the swinging arm 132 and the trigger. When the follower roll 119 passes from the cam strip 118, the spring 130 causes the link 122 to force the trigger out of engagement with the block 131 and thus there is no operative connection between the follower 133 and the arm 134.

Referring to the lower right hand portion of Fig. 1, a cam lug 124 is secured upon the gear 115 and this lug acts to trip an arm 125 once in each revolution of the gear 115. The arm 125 is pivotally mounted on the tank 10 at 126 and carries upon its under face a contact 127 which is normally yieldingly held against terminals 128 by a spring as 129, the contact being moved out of such engagement when the arm 125 is tripped to stop the operation of the machine in the manner which will be presently described.

The control mechanism

Referring to the bottom of Fig. 1, there is diagrammatically illustrated a suitable form of control mechanism which is designed to provide the periodic operation of the various parts. This mechanism controls the operation of the motor 100 which drives the apparatus.

A clock 150 is set to make and break a battery circuit as 151 at predetermined intervals, and in this circuit is located a relay 152. When this relay is energized by the closing of the contact at the clock, it acts to move an armature 153 to establish contact at 154. This causes a solenoid as 155 to be energized from power source 156 through the leads 157, 153, 154, 158, 159 and 160. The energizing of the solenoid closes the switch at 161 and this energizes the motor 100 through the leads 162, 163 and 160.

Referring now to the lower right hand portion of Fig. 1. During the freezing operation the lug 124 on the gear 115 was in the position shown, the arm 125 being in raised position and the contact 127 out of engagement with the terminals 128. When the control mechanism acts to start the motor, the operation of this motor causes the gear 115 to be rotated, moving the lug 124 out of engagement with the arm 125 and causing the contact to connect the terminals 128.

Again referring to the control system in which the operation of the motor has been started as described. The clock 150 now operates to break the circuit 151, deenergizing the relay 152 and opening the circuit 157, 158, 159 and 160, but the motor 100 will continue to operate as the solenoid switch 155 remains energized from the source of power 156 through the leads 164, 165, 166 and 160, the terminals 128 having been connected by the contact 127. When the operation of the motor has caused the gear 115 to make a complete revolution, the lug 124 contacts with the arm 125, raising this arm and breaking the connection at the contact 127. This stops the motor. A complete cycle of operations takes place during this single revolution of the gear 115.

The operation of the apparatus

At the start of operations, the parts are in the relative positions shown in the drawings. The tank 10 contains water to the level automatically established by the float valve 12, and the pockets or molds 54 in the belt or apron 50 are filled therewith. Brine or other refrigerating medium is now admitted to the interior of the cylinder 16 through the inlet pipe 30 and is directed upon the cylinder wall 27 by the heads 33. The control clock 150 has been set to operate to start the motor 100 at the end of the period required to freeze the water within the molds or pockets in the belt or apron.

During the freezing operation, all parts of the apparatus are at rest excepting air jets or other means for agitation (not shown). Heat exchange takes place through the wall 27 and the water in the molds progressively becomes solidified, beginning next to the cylinder wall and building outwardly.

At the completion of the freezing operation, a block of ice at least partially fills each of the molds or pockets in the belt. The clock 150 at this time automatically starts the motor 100 in the manner described in connection with the control mechanism, causing the cylinder 16 to be rotated one step or approximately one eighth of a revolution through the medium of the cams 104, roll 106, lever 105, pawl 108, ratchet 109, shaft 110 and gears 111, 112 and 113. Each succeeding revolution of the cam 104 advances the rotation of the cylinder a like amount.

The direction of rotation of the cylinder 16 is indicated by an arrow (Fig. 1), the belt or apron 50 being directly driven by the cylinder frictionally and through the medium of the teeth 58 acting in the belt slots 57. This belt in the apparatus shown moves approximately the distance of five openings or one group. After a definite number of these advances, say five, the first group of molds is brought into registration with the opening 81 in the table 82 as indicated in dotted lines at 80 (Fig. 1) and the belt stops.

During this pause in the advance of the belt, the cams 104 cause the platform 84 to be pressed toward the table 82, forcing the plungers 87 through this group of molds and ejecting the ice therefrom. The ice thus ejected passes through the opening 81 onto the chute 90, as described. The cams 104 now permit the platform 84 to return under the action of the springs 89, withdrawing the plungers 87, and the belt makes a second advance to bring a new group of molds into position to have the ice ejected therefrom. These operations continue in sequence until all ice has been removed from the belt and such belt has made a complete revolution, returning to its initial position. This completes a cycle of operations.

For the purpose of illustration, the length of the belt 50 is assumed to be three times the circumference of the cylinder 16. Thus the cylinder makes three complete revolutions in each cycle, and the gears 114 and 115 are in the ratio of one to three so that the gear 115 will make a complete revolution in each cycle. At the completion of the cycle, the lug 124 on the gear 115 has acted in the manner described to break the operating circuit at 127, and the motor is stopped. This motor will remain inactive until another freezing period has been completed and the clock 150 has acted to again start the discharging operation. It will thus be seen that the apparatus will automatically continue to operate in successive cycles until stopped by the operator.

The conductors 42, shown in the lower right hand portion of Fig. 2, connected to the heating unit 40 within the cylinder 16, may be connected across the motor leads 162 and 163 (bottom of Fig. 1) so that when the motor is energized to start the discharging operation, the heater 40 applies heat to the portion of the cylindrical wall opposite thereto. This heat acts to warm the surface of the cylinder at this point sufficiently to loosen the ice blocks carried in the belt 50 as the cylinder rotates. A very slight amount of heat is required to accomplish this result. When the motor is stopped by the breaking of the motor circuit in the manner described, this automatically shuts off the current from the heater 40 and such heater remains inactive during the freezing operation.

To briefly summarize the operation of the apparatus shown, it will be seen that in this apparatus all parts excepting agitation means are stationary during the freezing of the ice blocks in the molds. Upon the completion of the freezing operation, the belt is advanced intermittently to bring the ice to the discharging mechanism which operates during each period of pause of the belt. The discharged ice is conducted from the apparatus by the chute or other suitable means. The belt and cylinder are stationary during the operation of the discharging means and the advance is resumed as soon as the plungers have been withdrawn. While the mold portion of the belt in the apparatus shown moves by a step by step movement from the time it leaves the cylinder until it reaches the first discharging position, it will be evident that mechanism may be provided to produce an uninterrupted movement during this portion of the cycle, and such continuous movement might be resumed as soon as the last molds had been discharged.

From the foregoing description it will be evident that an apparatus has been provided which is simple and durable in construction, efficient and automatic in action and capable of withstanding the exacting conditions of commercial use. The applicaiton of heat to a portion of the cylinder wall serves to disengage the ice in the molds from the surface of the cylinder so that this ice may be readily carried in the belt openings in which it was frozen to the discharging mechanism. Heat exchange takes place rapidly between the refrigerating medium and the liquid in the pockets, so that ice is quickly formed in the molds. This apparatus and the method of manufacture enables ice in the form of small blocks in any desired shape or size to be quickly and economically produced in large volume. The freezing of ice cubes with a connecting web very materially facilitates the handling and packing of these cubes.

It will be seen that this invention comprises an art and an apparatus, both of an essentially practical nature in which the several objects referred to are attained.

As the art herein described may be carried out in various ways and as the apparatus may be materially changed without departing from the scope of the invention, it is to be understood that all matter herein set forth or shown in the accompanying drawings is to be interpreted as illustrative and not in a limiting sense.

I claim:

1. In apparatus of the character described, in combination, a revoluble cylinder adapted to contain a refrigerating medium, a flexible belt partially wrapped about the periphery of said cylinder, openings extending through said belt and forming with the periphery of the cylinder a series of pockets or molds on said periphery in which ice is frozen by exchange of heat through the cylinder wall, and means for raising the temperature of a portion of said cylinder wall to loosen the ice in said pockets preparatory to the discharge of the ice therefrom.

2. In apparatus of the character described, in combination, a revoluble cylinder adapted to contain a refrigerating medium, a flexible belt partially wrapped about the periphery of said cylinder and revoluble therewith, openings extending through said belt and forming with the periphery of the cylinder a series of pockets or molds on said periphery in which ice is frozen by exchange of heat through the cylinder wall, means for raising the temperature of a portion of said cylinder wall to loosen the ice in said pockets preparatory to the discharge of the ice therefrom, and means for removing the ice from said pockets.

3. In apparatus of the character described, in combination, a revoluble cylinder adapted to contain a refrigerating medium, a flexible belt partially wrapped about the periphery of said cylinder, transverse slots in said belt forming with the periphery of the cylinder in certain relative positions thereof, pockets to contain a liquid and within which the liquid is frozen by transfer of heat through the cylinder wall, and means within said cylinder for applying heat to a portion of the cylinder wall on the completion of the freezing operation to cause the ice in said pockets to be released from said wall.

4. In apparatus of the character described, in combination, a hollow member to contain a refrigerating medium, a covering about said member, openings extending through said covering to form with the external surface of the member a series of molds to receive a liquid and within which the liquid is frozen by heat exchange through the wall of the member, and means for applying heat to said wall opposite certain of said molds to cause the ice in the molds to be detached therefrom.

5. In apparatus of the character described, in combination, a hollow member to contain a refrigerating medium, a covering about said member, openings extending through said covering to form with the external surface of the member a series of pockets to receive a liquid and within which the liquid is frozen by heat exchange through the wall of the member, means for applying heat to said wall opposite certain of said pockets to cause the ice in the pockets to be detached from the wall, and means for relatively moving said member and said covering.

6. In apparatus of the character described, in combination, a revoluble cylinder to contain a refrigerating medium, an idler roll, a belt enveloping said cylinder and said idler roll, openings in said belt extending therethrough to form with the cylinder wall a series of molds to receive a liquid to be solidified therein by transfer of heat through the cylinder wall, means for raising the temperature of a portion of said wall adjacent certain of said molds to cause the solidified liquid therein to be disengaged from the wall, and means for rotating said cylinder and advancing said belt by a step by step movement upon the completion of the solidifying operation.

7. In apparatus of the character described, in combination, a revoluble cylinder to contain a refrigerating medium, an idler roll, a belt enveloping said cylinder and said idler roll, openings in said belt extending therethrough to form with the cylinder wall a series of pockets on the cylinder to receive a liquid to be solidified therein by transfer of heat through the cylinder wall, means for raising the temperature of a portion of said wall adjacent certain of said pockets to cause the solidified liquid therein to be disengaged from the wall, and means for periodically rotating said cylinder and advancing said belt preparatory to the discharge of the solidified liquid from said pockets.

8. In apparatus of the character described, in combination, a receptacle having a heat conducting wall, a refrigerating medium in said receptacle, and a covering of heat insulating material on the exterior of said wall having openings extending therethrough and forming with the wall a series of pockets to receive a liquid and within which the liquid is solidified by transfer of heat through the receptacle wall, the solidified liquid in said pockets being disengaged from the wall by applying heat to a portion of the wall in the vicinity of said pockets.

9. In apparatus of the character described, in combination, a receptacle having a heat conducting wall, a refrigerating medium in said receptacle, and a covering of heat insulating material on the exterior of said wall having openings extending therethrough and forming with the wall a series of pockets to receive a liquid and within which the liquid is solidified by transfer of heat through the receptacle wall, and means for applying heat to said wall in the vicinity of said pockets to cause the solidified liquid in said pockets to be detached from said wall.

10. In apparatus of the character described, in combination, a tank to contain a liquid to be solidified, a revoluble cylinder partially immersed in said liquid, a refrigerating medium in said cylinder, pockets on the periphery of said cylinder to admit the liquid and in which said liquid is solidified by transfer of heat through the cylinder wall, means for partially rotating said cylinder to remove from the liquid a portion of said pockets after the liquid therein has solidified, stationary means within said cylinder for raising the temperature of the cylinder wall in the vicinity of the removed pockets to loosen the solidified liquid in said pockets, and means for ejecting the solidified liquid from said pockets.

11. In apparatus of the character described, in combination, a tank to contain a liquid to be solidified, a revoluble cylinder partially immersed in the liquid in said tank, a refrigerating medium in said cylinder, an idler roll, a belt passing about said cylinder and said roll and having openings extending therethrough to form with the submerged portion of the cylinder wall a series of pockets in which the liquid enters and is solidified by transfer of heat through said wall, means for revolving the cylinder after the liquid is solidified in said pockets to remove a portion of the pockets from the liquid, and means for raising the temperature of the cylinder wall in the vicinity of the pockets being removed from the liquid whereby the solidified liquid is detached from the cylinder wall.

12. In apparatus of the character described, in combination, a tank to contain a liquid to be solidified, a revoluble cylinder partially immersed in the liquid in said tank, a refrigerating medium in said cylinder, an idler roll, a belt passing about said cylinder and said roll and having openings extending therethrough to form with the submerged portion of the cylinder wall a series of pockets in which the liquid enters and is solidified by transfer of heat through said wall, means for simultaneously rotating the cylinder and the belt to withdraw certain of the pockets from the liquid after the liquid therein has been solidified, and means for applying heat to the cylinder wall in the vicinity of the withdrawn pockets to detach the solidified liquid in said pockets from said wall.

13. In apparatus of the character described, in combination, a tank to contain a liquid to be solidified, a revoluble cylinder partially immersed in the liquid in said tank, a refrigerating medium in said cylinder, an idler roll, a belt passing about said cylinder and said roll and having openings extending therethrough to form with the submerged portion of the cylinder wall a series of molds in which the liquid enters and is solidified by transfer of heat through said wall, means for simultaneously rotating the cylinder and the belt to withdraw certain of the molds from the liquid after the liquid therein has been solidified, means for applying heat to the cylinder wall in the vicinity of the withdrawn molds to detach the solidified liquid in said molds from said wall, and means for removing the solidified liquid from the withdrawn molds.

14. In apparatus of the character described, in combination, a revoluble heat exchange cylinder partially immersed in water, an idler roll spaced from said cylinder and having its axis parallel with the axis thereof, a belt wrapped about said cylinder and said roll and revoluble with said cylinder, said belt having openings extending therethrough and forming with the cylinder wall pockets to receive the water and within which said water is frozen by transfer of heat through the cylinder wall, means for rotating the cylinder to cause a portion of said pockets to be withdrawn from the water, means for applying heat to the interior of the cylinder wall in the vicinity of the withdrawn pockets to detach the ice from said wall after the completion of the freezing operation, and plungers movable through said openings to eject the ice therefrom.

15. In apparatus of the character described, in combination, a receptacle to contain a refrigerating medium, pockets on the exterior of a wall of the receptacle to receive a liquid to be solidified therein by exchange of heat through said wall, certain of the pockets being connected to cause a web of ice to be formed between the blocks of ice in adjoining pockets.

16. In apparatus of the character described, in combination, a receptacle to contain a refrigerating medium, communicating pockets on the exterior of a wall of the receptacle to receive a liquid to be solidified therein by exchange of heat through said wall, the ice blocks formed in the individual pockets being connected by webs of ice.

17. In apparatus of the character described, in combination, a receptacle to contain a refrigerating medium, pockets formed by partitions on the exterior of a wall of the receptacle to receive a liquid to be solidified therein by exchange of heat through said wall, certain of the partitions being constructed to permit a web of ice to form between the blocks of ice on opposite sides thereof, said web being formed immediately adjacent the receptacle.

18. In apparatus of the character described, in combination, a receptacle having a refrigerating medium therein, and a substantially insulated covering on the exterior of said receptacle having openings therein exposing the portion of the receptacle wall opposite thereto, said openings forming with the exposed portions of the wall a series of pockets on the exterior of the receptacle to receive a liquid and within which said liquid is frozen by heat exchange through the receptacle wall, the walls of said pockets being constructed to provide markings upon the ice in the pockets.

19. In apparatus of the character described, in combination, a refrigerating wall having a freezing surface, means for applying a fluid to be solidified to said freezing surface, means for partitioning off said freezing surface to form a number of pockets thereon, certain of said partitioning means extending to a point above said freezing surface but not contacting therewith and thereby forming connecting pockets upon said freezing surface, and means for applying heat to said refrigerating wall to loosen the partitioning means and solidified fluid therefrom, whereby the partitioning means and solidified fluid may be removed from the freezing surface.

20. In apparatus of the character described, in combination, a refrigerating surface, removable partitioning means for partitioning off said refrigerating surface, certain portions of said partitioning means forming interconnected pockets with the refrigerating surface, whereby webs of solidified fluid are formed between the blocks of solidified fluid in the interconnected pockets.

21. In apparatus of the character described, in combination, a refrigerating surface, removable partitioning means for partitioning off said refrigerating surface, certain portions of said partitioning means forming interconnected pockets, the interconnections being adjacent the refrigerating surface, whereby webs of solidified fluid are formed between the blocks of solidified fluid in adjoining pockets, and means for removing said partitioning means and solidified fluid from said refrigerating surface, and for ejecting said solidified fluid from said partitioning means.

22. The method of congealing a fluid, comprising the steps of supplying said fluid to a refrigerated surface, of automatically positioning ice-shaping means adjacent said surface prior to the congealing of the fluid thereon and about part of which the congealing fluid is congealed by said refrigerated surface, of supplying heat to said refrigerated surface to loosen the congealed fluid therefrom, and of automatically removing said ice-shaping means from said surface to remove the congealed fluid therefrom.

23. In apparatus for congealing a fluid, in combination, a refrigerated surface, a source of fluid to be solidified, removable means normally positioned intermediate said surface and fluid supply so as to cause fluid congealing on said surface to form about said means; means for heating said refrigerated surface to loosen the congealed fluid therefrom, and means for automatically removing said removable means with the congealed fluid from its normally intermediate position to permit the removal of the congealed fluid therefrom, and for returning it to its normally intermediate position.

24. In appparatus for manufacturing ice, in combination, an ice shaping surface, means for refrigerating a portion thereof, means for supplying water to the refrigerated portion; removable means normallly positioned intermediate the refrigerated surface and said water suppply and protecting portions of said refrigerated surface from said water, whereby the water freezing on said surface freezes around said removable means; means for heating a portion of said ice shaping surface not being refrigerated to loosen the ice frozen thereon; and means for autmotically removing said removable means from its normally intermediate position to permit ice attached thereto to be removed, and for returning said removable means to its normally intermediate position.

25. Apparatus for freezing liquid comprising, in combination, a refrigerated surface, means for supplying to said surface liquid to be frozen, removable partitioning means for partitioning off said freezing surface to cause liquid freezing thereon to assume predetermined shapes, and means for applying heat to said refrigerated surface to loosen the solidified fluid therefrom whereby it is removable with said partitioning means; automatic means for applying said partitioning means to and removing it from said surface, and means for controlling the operation of said automatic means to vary its operation with the rate of freezing.

26. Apparatus for freezing liquid comprising, in combination, a refrigerated surface, means for supplying to said surface liquid to be frozen, removable partitioning means for partitioning off said freezing surface to cause said liquid to freeze thereon in predetermined shapes, and means for applying heat to said refrigerated surface to loosen the solidified fluid therefrom whereby it is removable with said partitioning means; means for automatically applying said partitioning means to and removing it from said surface, and time controlled electrically operated means for controlling the operation of said automatic means.

27. Apparatus for freezing liquid comprising, in combination, a refrigerated surface, means for supplying to said surface liquid to be frozen removable partitioning means for partitioning off said freezing surface to cause said liquid to freeze thereon in predetermined shapes, and means for applying heat to said refrigerated surface to loosen the solidified fluid therefrom whereby it is removable with said partitioning means; time controlled electrically operated automatic means for applying said partitioning means to and removing it from said surface.

28. Apparatus for freezing liquid comprising, in combination, a refrigerated surface, means for supplying liquid to said freezing surface to be frozen, removable interstitial means coacting with said refrigerated surface and adapted to be applied to and removed from said surface, whereby said liquid in freezing on said refrigerated surface forms about said interstitial means while it is applied to said surface, means for applying heat to said refrigerated surface to loosen the solidified fluid therefrom, and electrically operated time controlled automatic means for applying said removable interstitial means to and removing it from said refrigerated surface.

CROSBY FIELD.